US007595970B2

(12) United States Patent
McCoy

(10) Patent No.: US 7,595,970 B2
(45) Date of Patent: *Sep. 29, 2009

(54) ELECTRONIC TRIP INDICATOR

(75) Inventor: Brian Timothy McCoy, Duluth, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 172 days.

This patent is subject to a terminal disclaimer.

(21) Appl. No.: 10/923,952

(22) Filed: Aug. 23, 2004

(65) Prior Publication Data

US 2005/0105234 A1 May 19, 2005

Related U.S. Application Data

(60) Provisional application No. 60/498,944, filed on Aug. 29, 2003.

(51) Int. Cl.
*H02H 5/04* (2006.01)
*H01H 73/00* (2006.01)

(52) U.S. Cl. ........................ 361/103; 361/105; 361/115

(58) Field of Classification Search ................. 361/103, 361/105, 115
See application file for complete search history.

(56) References Cited

U.S. PATENT DOCUMENTS

| | | | | |
|---|---|---|---|---|
| 4,616,200 | A * | 10/1986 | Fixemer et al. | 335/35 |
| 5,012,495 | A | 4/1991 | Munroe | |
| 5,291,165 | A * | 3/1994 | Whipple et al. | 335/18 |
| 5,546,266 | A * | 8/1996 | Mackenzie et al. | 361/93.4 |
| 6,049,143 | A | 4/2000 | Simpson | |
| 6,107,992 | A * | 8/2000 | Ishigaki | 345/158 |
| 6,239,677 | B1 * | 5/2001 | Ramakrishnan et al. | 335/35 |
| 6,552,884 | B2 * | 4/2003 | Kim et al. | 361/42 |
| 6,703,917 | B2 | 3/2004 | Belenger | |
| 7,030,769 | B2 * | 4/2006 | Miller | 340/635 |

* cited by examiner

*Primary Examiner*—Fritz M. Fleming
*Assistant Examiner*—Lucy Thomas
(74) *Attorney, Agent, or Firm*—Jose de la Rosa

(57) ABSTRACT

Certain exemplary embodiments comprise an apparatus comprising, a circuit breaker comprising: an integral thermo-magnetic trip device adapted to trip said circuit breaker upon an occurrence of a current overload; an integral electronic trip device adapted to trip said circuit breaker upon detection of a ground fault and adapted to trip said circuit breaker upon detection of an arc fault; and a trip indicator adapted to visually indicate an occurrence of a trip of only said electronic trip device.

16 Claims, 2 Drawing Sheets

ELECTRONIC TRIP INDICATOR

CROSS-REFERENCES TO RELATED APPLICATIONS

This application claims priority to, and incorporates by reference herein in its entirety, U.S. Provisional Patent Application Ser. No. 60/498,944 , filed 29 Aug. 2003.

BACKGROUND

U.S. patent application Ser. No. 6,552,884 (Kim), which is incorporated by reference herein in its entirety, allegedly recites a "circuit breaker which displays electronically state of the circuit breaker and the cause of the disconnection which enables users to determine whether to reconnect a conductor which connects a source and a load in power distribution system. An arc display part is coupled to an arc fault detector, a ground display part is coupled to a ground fault detector and an overload display part is coupled to an overload detector. If arc fault occurs, the arc fault detector generates a trip signal and the trip signal is provided to the arc display part. As the trip signal from the arc fault detector is not provided to the ground display part and the overload display part, users can determine that arc fault has occurred by the lighting of the arc display part." See Abstract.

U.S. patent application Ser. No. 6,049,143 (Simpson), which is incorporated by reference herein in its entirety, allegedly recites an "electrical connection safety apparatus which eliminates the risk of fire or electric shock associated with current overload faults in electrical systems. The apparatus senses or detects the electrical current rating of electrical appliances or electrical cords or connectors which are plugged into electrical outlets, and disconnects power to the appliance or outlet and connector whenever the current rating is exceeded. Current rating is indicated by a preset current threshold for the appliance or by a detectable feature associated with an electrical connector. Circuitry monitors the load current delivered to the appliance or receptacle and connector and compares the load current to detected current rating. When a current overload occurs, power to the appliance or receptacle and connector is disconnected." See Abstract.

U.S. patent application Ser. No. 5,546,266 (Mackenzie), which is incorporated by reference herein in its entirety, allegedly recites that "[i]n a circuit interrupter which has multiple electronic trip circuits, such as ground fault and arcing fault trip circuits, indicators such as LED's produce an indication of the cause of the trip. The trip signals are latched to provide a continuing trip indication and ORed to actuate the trip device. In one embodiment SCR's connected in series with the indicator LED's serve as the latches and are connected in parallel to the trip device to provide the OR function. In other embodiments, flip-flops serve as the latches. In one such embodiment, the indicator LED's are connected from the respective flip-flops in parallel to the trip device to provide the OR function. In another such embodiment the flip-flops actuate the trip device and turn on switches actuating the LED's. These switches energizing the cause of trip LED's are disabled until the contacts open to assure operation of the trip device. Alarms can be coupled to the trip circuit by additional LED's, preferably IR LED's, connected in series with the indicator LED's." See Abstract.

U.S. patent application Ser. No. 5,012,495 (Munroe), which is incorporated by reference herein in its entirety, allegedly recites an "improved device for protecting an electrical load from a current overload combines an electrical switch and a re-settable circuit breaker in a single housing. The device avoids the use of gate plates, visually alerts an operator to the existence of a tripped conditions, and provides automatically self-aligning, evenly-wearing contacts for the switch."See Abstract.

SUMMARY

Certain exemplary embodiments comprise an apparatus comprising, a circuit breaker comprising: an integral thermomagnetic trip device adapted to trip said circuit breaker upon an occurrence of a current overload; an integral electronic trip device adapted to trip said circuit breaker upon detection of a ground fault and adapted to trip said circuit breaker upon detection of an arc fault; and a trip indicator adapted to visually indicate an occurrence of a trip of only said electronic trip device.

BRIEF DESCRIPTION OF THE DRAWINGS

A wide variety of potential embodiments will be more readily understood through the following detailed description of certain exemplary embodiments, with reference to the accompanying drawings in which.

DEFINITIONS

Figure 1:
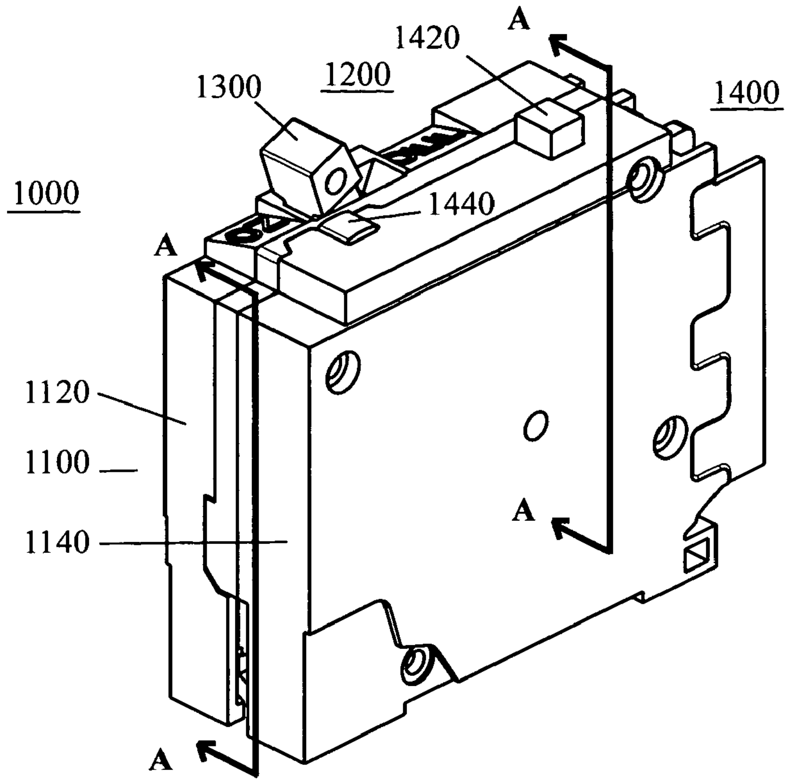
FIG. 1 is a perspective view of an exemplary embodiment of a circuit breaker 1000 in an ON position.

When the following terms are used herein, the accompanying definitions apply:

actuate—to put into motion or action; activate.

alternating current—an electric current that reverses direction in a circuit at regular intervals.

arc fault—a discharge of electricity between two or more conductors, the discharge associated with at least a predetermined voltage, current, and/or power level.

armature—a part of an electromagnetic device that moves.

biased—urged in a direction.

can—is capable of, in at least some embodiments.

circuit breaker—a device adapted to automatically open an alternating current electrical circuit.

comprising—including but not limited to.

current overload—a flow of current above a predetermined value.

electronic trip device—an apparatus adapted to automatically open an electrical circuit upon detection of a predetermined electrical phenomena, such as a ground fault or an arc fault.

expose—to make readily visible.

ground fault—any undesirable current path from a current-carrying conductor to ground.

handle—a manually operable lever for setting and/or resetting a position and/or status of a circuit breaker.

integral—formed or united into another entity.

latch—that which releasably fastens or holds.

may—is allowed to, in at least some embodiments.

non-electrically rendered—made perceptible via means that do not require electricity to continually operate, such as a flag, needle, dial, pointer, handle, etc. In contrast, something can be electrically rendered via means that does require electricity to continually operate, such as a light, LED, LCD, siren, etc.

ON position—a location and/or configuration associated with a closed circuit.

predetermined—established in advance.

release—to free from something that binds, fastens, or holds back.

reset—to move from a TRIPPED position and/or status to an ON position and/or status.

solenoid—an assembly used as a switch, and comprising a coil and a metal core free to slide along the coil axis under the influence of the magnetic field.

substantially—to a great extent or degree.

system—a collection of mechanisms, devices, and/or instructions, the collection designed to perform one or more specific functions.

thermo-magnetic trip device—an apparatus adapted to automatically open an electrical circuit upon detection of a predetermined electrical phenomena occurring in conjunction with a flow of heat, such as a current overload or a voltage spike.

trip—to automatically interrupt current flow in an electrical circuit.

trip flag—an indicator that utilizes a color and/or pattern to indicate a TRIPPED electrical circuit.

trip indicator—an apparatus adapted to show a trip status (e.g., tripped, not tripped) of a circuit breaker or trip device.

TRIPPED position—a location and/or configuration associated with a tripped circuit.

voltage spike—a voltage above a predetermined value.

DETAILED DESCRIPTION

Certain exemplary embodiments can comprise a circuit breaker comprising: an integral thermo-magnetic trip device adapted to trip said circuit breaker upon an occurrence of a current overload; an integral electronic trip device adapted to trip said circuit breaker upon detection of a ground fault or an arc fault; and a trip indicator adapted to visually indicate an occurrence of a trip of only said electronic trip device.

The circuit breaker can be installed in an apparatus such as a typical circuit breaker panel for an alternating current electrical circuit. The circuit breaker can comprise a single or double handle. In the double handle arrangement, the handles can be bridged.

Figure 2:
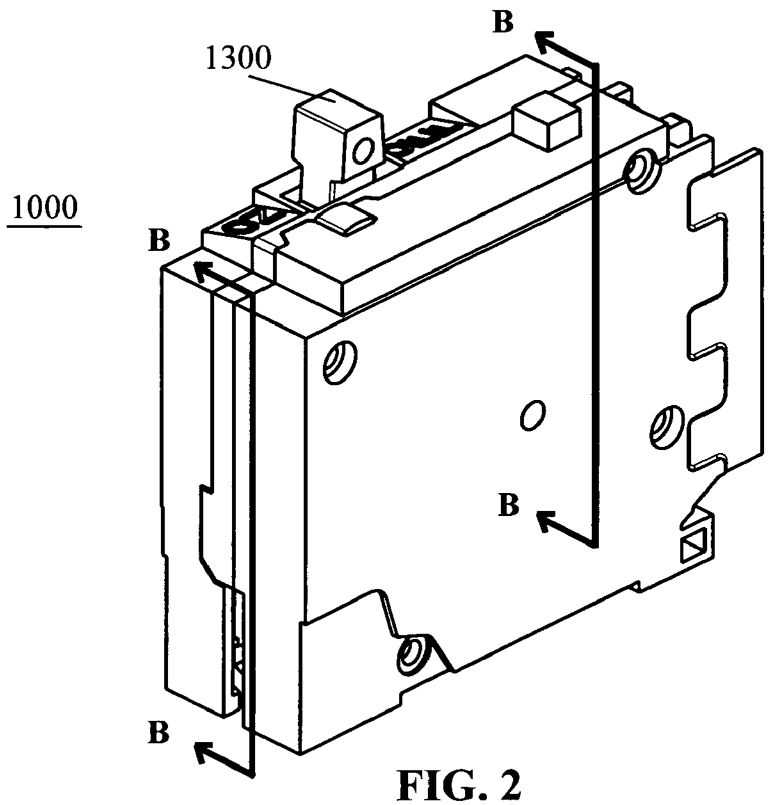
FIG. 2 is a perspective view of an exemplary embodiment of a circuit breaker 1000 in a TRIPPED position.

FIG. 1 is a perspective view of an exemplary embodiment of a circuit breaker 1000 in an ON position, and FIG. 2 is a perspective view of an exemplary embodiment of a circuit breaker 1000 in a TRIPPED position. Circuit breaker 1000 can comprise a body 1100 that can substantially contain and or surround most of the components of circuit breaker 1000. Body 1100 can comprise a thermo-magnetic portion 1120 that can comprise a well known thermo-magnetic trip device 1200. Body 1100 can comprise an electronic portion 1140 that can comprise a well known electronic trip device 1400.

Via its position with respect to body 1100, a handle 1300 can visually indicate a status of circuit breaker 1000, such as ON, TRIPPED, and/or OFF, etc. Handle 1300 can be moved into the TRIPPED position automatically by operation of various components of circuit breaker 1000. Thus, by nature of its position, handle 1300 can indicate a TRIPPED status without the application of electricity thereto, and thus handle 1300 can serve as a non-electrically rendered trip indicator. Handle 1300 can be moved into the ON, TRIPPED, and OFF positions manually. As shown, handle 1300 is in the ON position in FIG. 1, and in the TRIPPED position in FIG. 2.

Circuit breaker 1000 and/or electronic trip device 1400 can comprise an electronic trip indicator window 1440, through which a trip flag (shown in FIG. 3) can be revealed upon occurrence of a particular type of trip, such as either a thermoelectric trip or an electronic trip. Circuit breaker 1000 and/or electronic trip device 1400 can comprise a ground fault reset test button 1420, the manual actuation of which can trip circuit breaker 1000, electronic trip device 1400, and/or handle 1300 from an ON position to a TRIPPED position, thereby potentially revealing an electronic trip flag.

To reset circuit breaker 1000, thermo-magnetic trip device 1200, and/or electronic trip device 1400, handle 1300 can be moved from the TRIPPED position to the OFF position, and then to the ON position.

Figure 3:
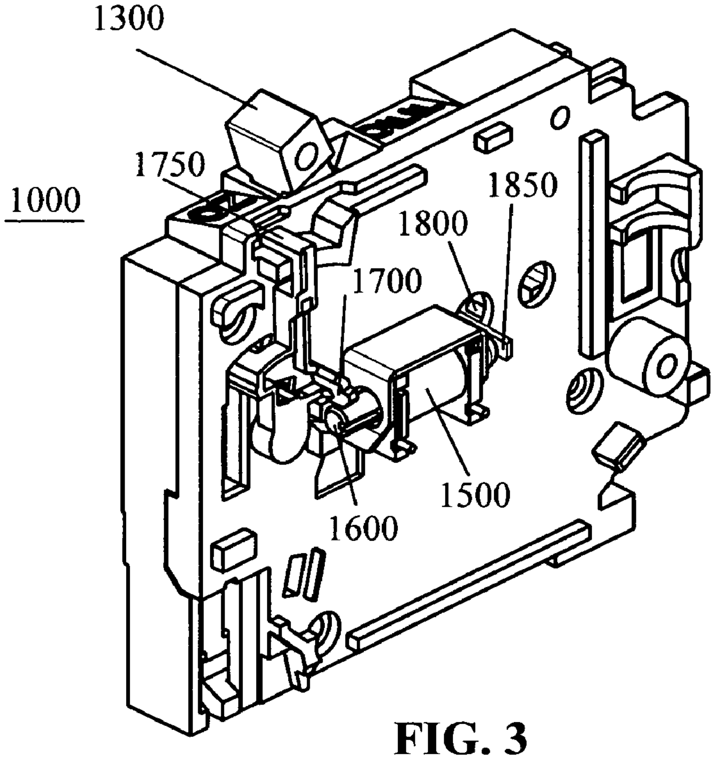
FIG. 3 is a cross-sectional view taken at section line A-A of FIG. 1.
Figure 4:
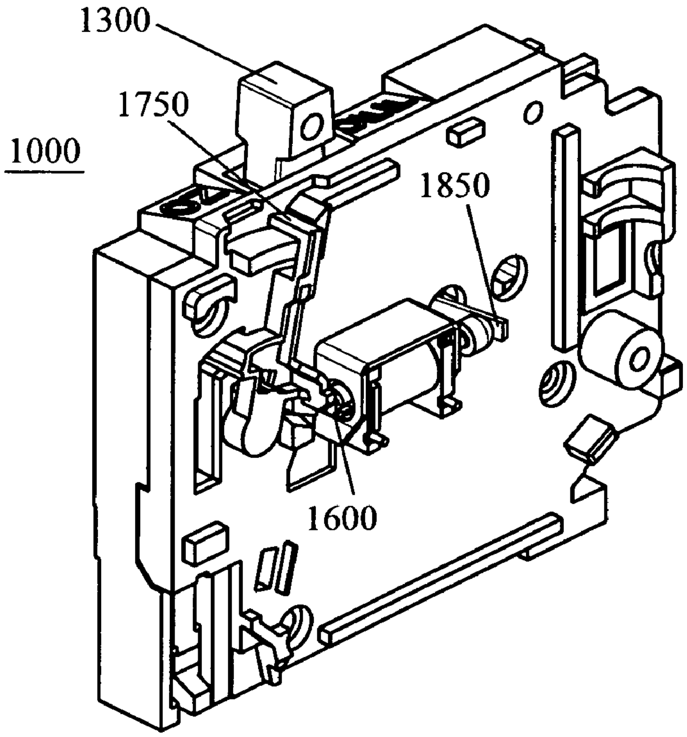
FIG. 4 is a cross-sectional view taken at section line B-B of FIG. 2.

FIG. 3 is a cross-sectional view taken at section line A-A of FIG. 1, and FIG. 4 is a cross-sectional view taken at section line B-B of FIG. 2. Circuit breaker 1000 and/or electronic trip device 1400 can comprise a solenoid 1500 that can be actuated upon detection of a predetermined condition, such as a ground fault and/or an arc fault.

A first end of plunger 1600 that is integral and/or attached to solenoid 1500 can be positioned to contact a trip flag arm 1700, to which a trip flag 1750 can be integral. A second end of plunger 1600 can contact a biased thermo-magnetic trip arm or armature 1850, which can extend through a passage 1800 and be coupled to thermo-magnetic trip device 1200.

Prior to actuation of electronic trip device 1400 and/or solenoid 1500, when circuit breaker 1000, electronic trip device 1400, and/or handle 1300 are in the ON position, a first end of plunger 1600 that is integral and/or attached to solenoid 1500 can be positioned to raise a trip flag arm 1700, thereby causing an attached trip flag 1750 to appear in a non-tripped position, such that trip flag 1750 is not substantially visible through and/or via trip window 1440 (shown in FIG. 1).

Upon actuation of solenoid 1500, plunger 1600 can be positioned to release and/or lower trip flag arm 1700, thereby causing attached trip flag 1750 to appear in a tripped position and thereby be visible via the trip window, thereby visibly indicating that electronic trip device 1400 has tripped. To further enhance its visibility, trip flag 1750 can be colored and/or patterned. For example, trip flag 1750 can be colored bright yellow, or provided in a yellow and black stripped pattern, which can noticeably contrast with a background (such as a black background) that is visible via the trip window when trip flag 1750 is hidden or in a non-tripped position.

Also, plunger 1600 can move biased armature 1850, thereby tripping thermo-magnetic trip device 1200, and thereby causing circuit breaker 1000 and/or handle 1300 to move from the ON position to the TRIPPED position.

Upon actuation of electronic trip device 1400 alone, circuit breaker 1000 and/or handle 1300 can move from the ON position to the TRIPPED position, and trip flag 1750 can be visible in the trip window. Thus, handle 1300 can indicate the occurrence of some type of trip, and trip flag 1750 can indicate the occurrence of an electronic trip, leading one to deduce that the trip involved electronic trip device 1400, and thus was likely and/or definitely caused by a ground fault and/or arc fault.

Upon actuation of thermo-magnetic trip device 1200 alone, circuit breaker 1000 and/or handle 1300 can move from the ON position to the TRIPPED position, yet no trip signal need be sent to solenoid 1500, and thus no movement of trip flag 1750 need occur. Thus, trip flag 1750 can indicate the non-occurrence of an electronic trip, yet handle 1300 can indicate the occurrence of some type of trip, leading one to deduce that the trip involved thermo-magnetic trip device 1200, and thus was likely and/or definitely caused by a current overload and/or voltage spike.

Upon resetting circuit breaker 1000 and/or handle 1300 by moving handle 1300 from the TRIPPED position to the OFF position (possibly followed by moving handle 1300 to the ON position), thermo-magnetic trip device 1200 and/or electronic trip device 1400 can be reset, and thereby trip flag 1750 can be returned to the untripped position.

Thus, the electronic trip indicator can indicate if the trip was generated by the electronic trip function of the circuit breaker, thereby helping to isolate the cause of the trip and/or facilitating trouble-shooting of the circuit.

Certain exemplary embodiments can comprise a method for indicating a cause of a trip of a circuit breaker. The method can include providing a circuit breaker that comprises an integral thermo-magnetic trip device adapted to trip said circuit breaker upon an occurrence of a current overload; an integral electronic trip device adapted to trip said circuit breaker upon detection of a ground fault and adapted to trip said circuit breaker upon detection of an arc fault; and/or a trip indicator adapted to visually indicate an occurrence of a trip of only said electronic trip device.

Upon detection of a ground fault and/or an arc fault, the integral electronic trip device can trip the circuit breaker. Upon tripping the circuit breaker, a trip indicator can visually indicate an occurrence of a trip of only the electronic trip device.

Certain exemplary embodiments comprise an apparatus comprising, a circuit breaker comprising: an integral thermo-magnetic trip device adapted to trip said circuit breaker upon an occurrence of a current overload; an integral electronic trip device adapted to trip said circuit breaker upon detection of a ground fault and adapted to trip said circuit breaker upon detection of an arc fault; and a trip indicator adapted to visually indicate an occurrence of a trip of only said electronic trip device.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render any claim seeking priority hereto invalid, then any such conflicting information in such incorporated by reference material is specifically not incorporated by reference herein.

What is claimed is:

1. An apparatus, comprising;

a circuit breaker comprising:

an integral thermo-magnetic trip device adapted to trip said circuit breaker upon an occurrence of a current overload;

an integral electronic trip device comprising:

a plunger having a first end and a second end;

a trip flag arm releasably contacting the first end of the plunger comprising:

a trip flag coupled to the trip flag arm such that the trip flag visually indicates occurrence of a trip of only the integral electronic trip device when the trip flag arm is released;

a solenoid coupled to the first end of the plunger and adapted to actuate the plunger upon detection of at least one of a ground fault or an arc fault;

a biased armature adapted to be contacted by the second end of the plunger and coupled to the integral thermo-magnetic trip device, wherein the biased armature trips the integral thermo-magnetic trip device when contacted by the plunger; and wherein the plunger is adapted to contact the biased armature with the second end and release the trip flag arm when actuated by the solenoid; and a non-electrically rendered trip indicator handle adapted to visually indicate an occurrence of a trip of said circuit breaker.

2. The apparatus of claim 1, wherein said solenoid is adapted to actuate the plunger to move a biased armature from an ON position to a TRIPPED position.

3. The apparatus of claim 1, wherein said solenoid is adapted to actuate the plunger to move a biased armature from an ON position to a TRIPPED position upon detection of said ground fault.

4. The apparatus of claim 1, wherein said solenoid is adapted to actuate the plunger to move a biased armature from an ON position to a TRIPPED position upon detection of said arc fault.

5. The apparatus of claim 1, wherein said solenoid is adapted to actuate the plunger to release the trip flag arm and expose the trip flag upon detection of at least one of said ground fault and said arc fault.

6. The apparatus of claim 1, wherein said plunger is adapted to contact the trip flag arm to hide the trip when said circuit breaker is in an ON position.

7. The apparatus of claim 1, wherein said plunger is adapted to contact the trip flag arm to retain the trip flag in a hidden position when said circuit breaker has an ON status.

8. The apparatus of claim 1, wherein said plunger is adapted to release the trip flag arm to cause the trip flag to appear in an exposed position when said circuit breaker has a TRIPPED status.

9. The apparatus of claim 1, wherein said plunger is adapted to release the trip flag arm to expose the trip flag in an electronic trip indicator window upon detection of at least one of said ground fault and said arc fault.

10. The apparatus of claim 1, wherein said integral thermo-magnetic trip device is adapted to release said non-electrically rendered trip indicator handle from an ON position to a TRIPPED position.

11. The apparatus of claim 1, wherein said integral thermo-indicator trip device is adapted to release said non-electrically rendered trip indicator handle from an ON position to a TRIPPED position upon said occurrence of said current overload.

12. The apparatus of claim 1, wherein said integral thermo-magnetic trip device is adapted to release said non-electrically rendered trip indicator handle from an ON position to a TRIPPED position upon said occurrence of a voltage spike.

13. The apparatus of claim 1, wherein said integral thermo-magnetic trip device does not expose the trip flag upon said occurrence of said current overload.

14. The apparatus of claim 1, wherein said integral thermo-magnetic trip device does not expose the trip flag upon occurrence of a voltage spike.

15. The apparatus of claim 1, wherein said non-electrically rendered trip indicator handle is adapted to facilitate a manual change of a status of said circuit breaker.

16. A method for indicating a cause of a trip of a circuit breaker, comprising:

actuating a plunger with a solenoid upon detection of a ground fault or upon detection of an arc fault;

positioning a first end of the plunger to release contact from a trip flag arm in response to said actuating the plunger with the solenoid;

raising a trip flag coupled to the trip flag arm in response to said releasing of contact of the trip flag arm to the plunger to visually indicate an occurrence of a trip of only an electronic trip device;

positioning a second end of the plunger to bias an armature in response to said actuating of the plunger with the solenoid;

tripping a thermo-magnetic trip device with the armature in response to said biasing of the armature by the second end of the plunger;

moving a non-electrically rendered trip indicator handle to a TRIPPED position in response to tripping the thermo-magnetic trip device;

wherein said circuit breaker comprises the plunger, the solenoid, the trip flag arm, the trip flag, the armature, the thermo-magnetic trip device and the non-electrically rendered trip indicator handle.

* * * * *

UNITED STATES PATENT AND TRADEMARK OFFICE

CERTIFICATE OF CORRECTION

PATENT NO. : 7,595,970 B2
APPLICATION NO. : 10/923952
DATED : September 29, 2009
INVENTOR(S) : Brian Timothy McCoy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Twenty-eighth Day of September, 2010

David J. Kappos

*Director of the United States Patent and Trademark Office*